(12) United States Patent
Grimsley et al.

(10) Patent No.: US 10,197,660 B2
(45) Date of Patent: Feb. 5, 2019

(54) DUCTS WITH INFORMATION MODULES AND METHODS OF USE AND MANUFACTURE THEREOF

(71) Applicant: DURA-LINE CORPORATION, Knoxville, TN (US)

(72) Inventors: Timothy A. Grimsley, Knoxville, TN (US); Thomas McCall, Knoxville, TN (US)

(73) Assignee: DURA-LINE CORPORATION, Knoxville, TN (US)

( * ) Notice: Subject to any disclaimer, the term of this patent is extended or adjusted under 35 U.S.C. 154(b) by 0 days.

(21) Appl. No.: 15/486,504

(22) Filed: Apr. 13, 2017

(65) Prior Publication Data

US 2017/0219124 A1    Aug. 3, 2017

Related U.S. Application Data

(63) Continuation of application No. 15/140,736, filed on Apr. 28, 2016, now Pat. No. 9,625,560, which is a (Continued)

(51) Int. Cl.
*F16L 1/11*   (2006.01)
*G01S 1/04*   (2006.01)
(Continued)

(52) U.S. Cl.
CPC ............. *G01S 1/047* (2013.01); *F16L 1/036* (2013.01); *F16L 1/11* (2013.01); *F16L 7/02* (2013.01);
(Continued)

(58) Field of Classification Search
CPC ..................... F16L 1/11; G01S 1/047
(Continued)

(56) References Cited

U.S. PATENT DOCUMENTS 4,078,223 A * 3/1978 Strange .................. G01V 1/201
                                                         181/112
4,449,098 A * 5/1984 Nakamura ............... H01B 1/20
                                                         324/326
(Continued)

FOREIGN PATENT DOCUMENTS

| CA | 2817162 | 5/2012 |
| DE | 102006036720 | 2/2008 |
| EP | 0408320 | 5/1994 |

OTHER PUBLICATIONS

Canada Office Action issued in connection with related Patent Application No. 2838628, dated Jul. 14, 2015.
(Continued)

*Primary Examiner* — Frederick L Lagman
(74) *Attorney, Agent, or Firm* — Dentons US LLP; Brian R. McGinley; Roman Tsibulevskiy

(57) ABSTRACT

The present inventive concept includes a duct system and method for using same to map and locate ducts. A preferred embodiment of the duct system includes a duct, a plurality of electronic information modules and an oversheath at least partially covering the plurality of information modules and fixing the information modules to the duct. The plurality of information modules are configured to emit a positional signal to enable location of the information modules and associated duct(s) and/or mapping of the duct system.

19 Claims, 1 Drawing Sheet

Related U.S. Application Data continuation of application No. 14/146,874, filed on Jan. 3, 2014, now Pat. No. 9,383,427.

(60) Provisional application No. 61/750,103, filed on Jan. 8, 2013.

(51) Int. Cl.
*F24F 13/02* (2006.01)
*F16L 1/036* (2006.01)
*F16L 7/02* (2006.01)
*F16L 9/19* (2006.01)
*F16L 55/02* (2006.01)

(52) U.S. Cl.
CPC ............... *F16L 9/19* (2013.01); *F16L 55/02* (2013.01); *F24F 13/02* (2013.01); *F24F 2221/00* (2013.01)

(58) Field of Classification Search
USPC ......................................................... 405/157
See application file for complete search history.

(56) References Cited

U.S. PATENT DOCUMENTS

| | | | |
|---|---|---|---|
| 5,225,809 A | 7/1993 | Bunn | |
| 5,494,374 A * | 2/1996 | Youngs | F16L 9/18 405/129.45 |
| 5,871,034 A * | 2/1999 | Sumner | F16L 59/14 138/137 |
| 5,973,270 A * | 10/1999 | Keller | E21B 17/1035 174/136 |
| 5,985,385 A * | 11/1999 | Gottfried | B32B 1/08 405/157 |
| 6,812,707 B2 * | 11/2004 | Yonezawa | H01Q 1/52 324/326 |
| 7,226,243 B2 * | 6/2007 | Lee | F16L 59/125 138/113 |
| 7,308,911 B2 * | 12/2007 | Wilkinson | F16L 1/11 138/104 |
| 7,660,193 B2 * | 2/2010 | Goujon | G01V 1/201 367/15 |
| 8,362,919 B2 | 1/2013 | Cooper et al. | |
| 8,515,230 B2 * | 8/2013 | Lapp | H01L 37/368 385/101 |
| 8,790,040 B2 * | 7/2014 | Tomas | F16L 1/123 405/169 |
| 8,844,577 B2 | 9/2014 | Kiest, Jr. | |
| 9,379,442 B2 * | 6/2016 | Thomas | G06K 19/07766 |
| 9,383,427 B2 * | 7/2016 | Grimsley | F16L 1/11 |
| 9,625,560 B2 * | 4/2017 | Grimsley | G01S 1/047 |
| 2003/0103811 A1 * | 6/2003 | Grimseth | E21B 17/206 405/157 |
| 2003/0231020 A1 * | 12/2003 | Yonezawa | H01Q 1/52 324/326 |
| 2004/0076476 A1 * | 4/2004 | Hallot | F16L 59/143 405/157 |
| 2004/0211272 A1 * | 10/2004 | Aronstam | E21B 47/12 73/866.5 |
| 2005/0224124 A1 * | 10/2005 | Grimsley | G02B 6/4459 138/108 |
| 2006/0013065 A1 | 1/2006 | Varsamis | |
| 2007/0209865 A1 | 9/2007 | Kokosalakis et al. | |
| 2011/0025468 A1 * | 2/2011 | Longhurst | G01V 15/00 340/10.1 |
| 2011/0030875 A1 | 2/2011 | Conte et al. | |
| 2013/0092387 A1 | 4/2013 | Radi | |
| 2013/0263958 A1 * | 10/2013 | Vinoy | F16L 1/11 138/108 |

OTHER PUBLICATIONS

Canada Office Action issued in connection with related Patent Application No. 283628, dated Mar. 10, 2015.
Canada Office Action issued in connection with related Patent Application No. CN 283628 dated Mar. 10, 2015.
European Partial Search Report dated Apr. 15, 2014 issued in connection with related Patent Application No. 14150233.6-1758.
European Patent Office Extended search report issued in connection with related Patent Application No. 14150233.6, dated Aug. 11, 2014.
Canada Office Action issued in connection with related Canadian Patent Application No. 2977693, dated Oct. 12, 2017 (4 pages).

* cited by examiner

DUCTS WITH INFORMATION MODULES AND METHODS OF USE AND MANUFACTURE THEREOF

CROSS-REFERENCE TO RELATED APPLICATIONS

This application is a continuation of U.S. patent application Ser. No. 15/140,736, filed on Apr. 28, 2016, now U.S. Pat. No. 9,625,560, which is a continuation of U.S. patent application Ser. No. 14/146,874, filed Jan. 3, 2014, now U.S. Pat. No. 9,383,427, which claims a benefit of priority to U.S. Patent Application 61/750,103, filed on Jan. 8, 2013. Each of such applications is herein fully incorporated by reference for all purposes.

TECHNICAL FIELD

This present inventive concept relates generally to the field of conduit or duct systems for use in residential, commercial, industrial and other applications and, in particular, to a duct system including electronic information modules and methods for improved information gathering and mapping.

BACKGROUND

Ducts are essential to a wide variety of structures including residential, commercial, industrial, and governmental structures. For example, they may carry water, house fiber optic cables or other communications or power lines, or participate in critical pneumatic systems aboard vehicles. Ducts often experience high volumes of throughput, frequent changes in positioning, connectivity or conducted materials, or other conditions or changes that require them to be locatable for maintenance and other activities to be performed.

Existing duct systems are not designed so that individual duct lines can be located with ease and accuracy, particularly in applications where the lines are obscured from sight by obstructions such as soil in which such lines are buried. As such, significant expenses may be incurred in attempts to locate ducts, or in correcting work done based on erroneous information provided by or about existing duct systems. One existing method of locating a duct requires burying or otherwise placing a "tracer" or similar wire alongside the duct, for example during construction. Even though in certain applications the tracer wire may be attached to the duct before the duct is placed, there are several sources of potential error in using this method. These include the possibility that the positioning of the tracer wire on the duct will be disturbed during placement, or that the means for locating the tracer wire may hit on other metal objects and thus provide false positives for the location of the duct.

Further, in many existing systems, there remains the possibility that the tracer wire or similar device will become disassociated from the duct or otherwise damaged during or after the construction process, thus preventing accurate location of the duct. Such systems often have no economical way to provide redundancy in functionality, and failure of a tracer wire at any given location may cause failure of the entire location mechanism. Finally, there is no existing method for identifying individual, obscured duct sections or for obtaining similar specific information regarding the duct system's location and state.

The present inventive concept provides an improved duct system and a method for using same for mapping and location purposes.

SUMMARY

The following brief description is provided to indicate the nature of the subject matter disclosed herein. While certain aspects of the present inventive concept are described below, the summary is not intended to limit the scope of the present inventive concept. Embodiments of the present inventive concept provide an electronic module housing apparatus and method for attachment to a duct.

The present inventive concept provides, in its simplest form, a duct system including a duct, at least one information module and an oversheath at least partially covering the information module and fixing the information module to the duct. The information module emits at least a positional signal permitting location of the information module based on the information in the positional signal alone or in combination with other information. The information module may also emit a duct properties signal regarding the condition of the duct and/or its contents. The duct system may be designed such that each information module is within range of more than two other information modules, thus providing redundancy in systems where signals are exchanged between information modules in a "network", and allowing for continued routing of signal information along such a network of information modules even where one information module is malfunctioning or inoperable. Such a network may simply bypass the malfunctioning or inoperable information module and pass signal information over it to the next functioning module.

A method of using the duct system for mapping and/or location efforts is also disclosed herein. The steps of the method include providing at least one information module fixed to a duct that is configured to emit a positional signal, receiving, via a receiver, the positional signal from the information module, and plotting the positional signal from the information module on at least two axes.

The information module may further be configured to emit a duct properties signal relating to at least one of i) the condition of the duct, and ii) the contents of the duct, and the method may further include the step of receiving, via the receiver, the duct properties signal. The duct properties signal information may be used separately or following correlation with the positional signal information. The information contained in signals may ultimately pass from the information module to a user or computer system configured to process and/or plot such information.

Additional aspects, advantages, and utilities of the present invention will be set forth in part in the description which follows and, in part, will be obvious from the description, or may be learned by practice of the present invention.

BRIEF DESCRIPTION OF DRAWINGS

Embodiments of the present inventive concept are described in detail below with reference to the attached drawing figures, wherein.

Figure 1:
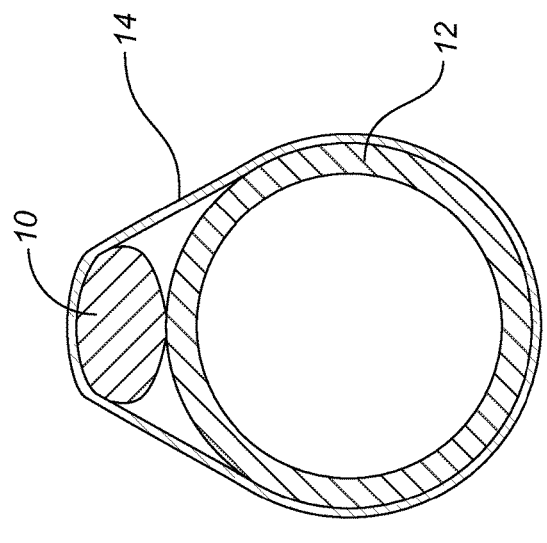
FIG. 1 is an enlarged front cross sectional perspective of the embodiment of FIG. 2 illustrating an information module attached to a duct using an oversheath.

The drawing figures do not limit the present inventive concept to the specific embodiments disclosed and described herein. The drawings are not necessarily to scale, emphasis instead being placed upon clearly illustrating the principles of the present inventive concept.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
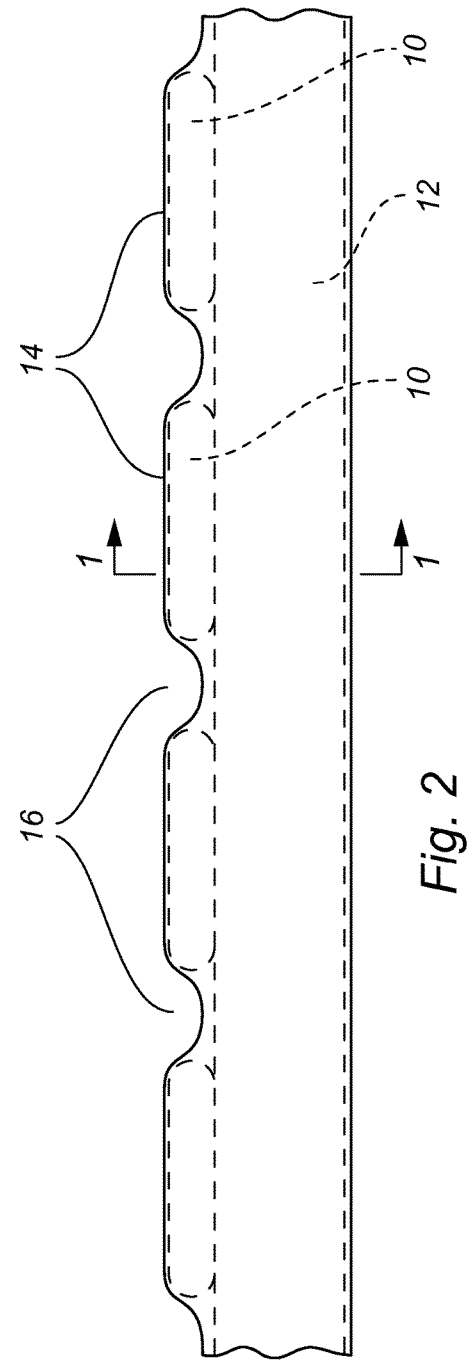
FIG. 2 is a side view of a duct system according to an embodiment of the present inventive concept including multiple information modules secured along the length of a duct by an oversheath.

Turning to FIG. 1, a single electronic information module 10 is illustrated from a front cross sectional perspective at line 1 of the embodiment of FIG. 2. The information module 10 is fixed to an exterior surface of a duct 12 using an oversheath 14. The information module 10 abuts the exterior surface of the duct 12 but is not embedded in the duct 12, thus preserving the structural integrity of the duct 12. The methods of installing information modules onto a duct or series of ducts of the present inventive concept may vary. In the preferred installation method, information modules are attached to the exterior of the duct at desired increments along its length using an adhesive or heat treatment. This assembly is processed through a die that applies an oversheath around the duct and information module assembly.

Though the material and thickness used for an oversheath may vary, the oversheath is preferably composed primarily of plastic such as a polyethylene plastic and is anywhere between 0.5-0.7" in thickness. Such thickness may be decreased for improved signal strength or smaller effective bulk of the duct, or increased to improve durability, e.g., in rough or rockier terrains. The oversheath may be heated prior to application to the information module and duct assembly to increase elasticity. Once applied to the assembly, the oversheath may be allowed to cool and constrict, thereby securing the information modules against the exterior of the duct.

Returning to FIG. 1, the information module 10 and duct 12 are surrounded by an oversheath 14 that wraps around a substantial portion of the exterior of the duct 12. On a portion of the duct's 12 surface that faces the information module 10, the oversheath 14 raises off from the exterior of the duct 12 to wrap around the exterior of the information module 10 and fix the information module 10 to the duct 12. In embodiments where the oversheath does not settle flush against the exterior of the duct and information module at the point where they interface, like in FIG. 1, pockets may form and provide additional benefits in the system, for example by providing space through which air or other fluids may flow to enhance cooling of the information modules. In other embodiments, the oversheath may contact an even greater proportion of the exterior of the duct, for example in embodiments where the oversheath is composed at least partially of heated plastic which is allowed to settle along the contours of the information module during construction of the apparatus, and which thereafter cools to secure the information module against the duct.

Turning now to FIG. 2, a duct system of an embodiment of the present inventive concept is shown from a side perspective. The system includes multiple information modules 10 spaced linearly along the length of a duct 12. The upper and lower extremities of the duct 12 are illustrated using broken lines in FIG. 2. An oversheath 14 wraps around the exteriors of the information modules 10 and duct 12, and secures the information modules 10 to the exterior of the duct 12. Depending on the conditions during installation in various embodiments, including the incremental spacing of the information modules along the duct, the thickness of the information modules, and other factors, this method of installing the information module housing apparatus onto a duct will produce troughs between the information modules, such as the troughs 16 illustrated in FIG. 2. The troughs 16 may be utilized in handling the duct 12 during installation, and may contribute to the electromagnetic characteristics of the assembled duct system, such as those characteristics that are detected as part of the transmission of signals from the information module to a receiver. Further, though the embodiment of FIG. 2 is illustrated with information modules 10 arranged linearly along the exterior of the duct 12, it is foreseen that the information modules 10 may be alternatively placed along the outer surface of the duct 12, for example in a non-patterned fashion at different points on the circumference of the duct, without departing from the spirit of the present inventive concept.

The information modules may transmit or emit information in signals such as radio transmissions, electronic currents through wires, or through other known means, and may do so actively on an intermittent or continuous basis or passively, for example in response to interrogation by a receiver. A "receiver" is a means for collecting signals from the information modules of the system of the present inventive concept, and may be integrated within one or more information modules or may be separate devices configured for receipt of the signals. A signal "range" refers to the maximum effective distance between a receiver and an information module within which the receiver is capable of receiving a signal from the information module, and depends on a number of factors such as signal strength, sophistication of the receiver, and number and type of interceding obstructions. The receiver may transmit signals obtained from the information modules to a user or to a separate piece of equipment, and may optionally perform further processing on the signals prior to any such transmission.

An "information module" is electronic and emits a positional signal that includes at least one of information i) that enables location of the information module with respect to another object, e.g., the receiver, on at least two axes, ii) regarding the coordinates of the information module on at least two axes, and iii) associated with the particular duct section to which the information module is fixed. Any or all of the foregoing items of information may be used for locating and/or mapping a duct system. In a preferred embodiment, a handheld receiver may be passed within the range of signal detection for the information modules of the duct system and will collect at least one of the foregoing types of information. Depending on the scope of the location or mapping needed, a user may then use the positional signals collected through the receiver to locate a particular duct section, or map an entire duct system. In certain embodiments, this may require processing the positional signals with other information, for example regarding relative position of another object, such as the receiver itself.

A receiver may also be integrated into one or more of the information modules, permitting positional signals to be exchanged between the information modules themselves in a network, for example to enable the calculation of relative positions amongst the information modules of the duct system. This embodiment may further provide for collection of positional signal information from the entire duct system by a receiver that is only within the positional signal range of one information module, for example because that information module has collected the positional signal information from the other information modules of the duct system that are within the network. Thus, in certain embodiments it may be preferable for any one information module to be within the positional signal range of at least four other information modules, e.g., with two on either side, to enable continued transmission of positional signals along the information module network even where one information module becomes inoperable and requires replacement or maintenance and is bypassed by the network.

In more sophisticated embodiments of the system, the information modules may further be configured to emit duct properties signals including information regarding at least one of: i) the condition of the duct, and ii) the contents of the duct. The information module may be configured with its own sensor(s) to detect such duct properties information or may simply receive such information from independent sensor apparatus(es). Information regarding the condition of the duct may relate to the integrity of the duct, the history of information exchange with receivers of the duct system, the features of the duct including valves or circuitry in proximity thereto, or other properties and characteristics. Information regarding the contents of the duct may include volumetric flow rate, pressure, electrical properties or performance information, or other properties or characteristics.

The duct system of the present inventive concept thus provides means for collecting information regarding the position of its constituent duct and/or duct sections and, optionally, regarding the condition and/or operation of the duct sections and their contents. This information can be mapped for ease of location and maintenance.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

What is claimed is:

1. A device comprising:
a duct;
a first module attached to the duct;
a second module; and
an oversheath covering the duct, the first module, and the second module such that the first module and the second module are positioned between the duct and the oversheath, wherein the duct, the oversheath, the first module, and the second module define an open space, wherein the open space contains a fluid which is able to cool at least one of the first module or the second module as the fluid flows through the open space.

2. The device of claim 1, wherein the at least one of the first module or the second module is attached to the duct via a heat treatment to the oversheath such that the oversheath constricts upon being allowed to cool.

3. The device of claim 1, wherein the oversheath extends along the duct longitudinally such that the oversheath defines a plurality of troughs, wherein at least one of the first module or the second module is positioned between the troughs.

4. The device of claim 3, wherein the troughs include a first trough and a second trough, wherein the first trough is between the first module and the second module.

5. The device of claim 4, wherein the second module is between the first trough and the second trough.

6. The device of claim 3, wherein at least one of the troughs avoids contact with the duct such that an open area is defined between the at least one of the troughs and the duct.

7. The device of claim 1, wherein the second module is attached to the duct.

8. The device of claim 7, wherein the first module is attached to the duct in a first attachment manner, wherein the second module are attached to the duct in a second attachment manner, wherein the first attachment manner is same as the second attachment manner.

9. The device of claim 7, wherein the first module is attached to the duct in a first attachment manner, wherein the second module are attached to the duct in a second attachment manner, wherein the first attachment manner is different from the second attachment manner.

10. The device of claim 1, wherein the open space is a first open space, wherein the fluid is a first fluid, wherein the duct, the oversheath, the first module, and the second module define a second open space, wherein the second open space contains a second fluid which is able to cool at least one of the first module or the second module as the second fluid flows through the second open space.

11. The device of claim 10, wherein the first open space opposes the second open space.

12. The device of claim 10, wherein the first open space is in fluid communication with the second open space.

13. The device of claim 10, wherein the first fluid and the second fluid is of a same fluid type.

14. A method comprising:
burying a device in a soil, wherein the device includes a duct, a first module, a second module, and an oversheath, wherein the oversheath covers the duct, the first module, and the second module such that the first module and the second module are positioned between the duct and the oversheath, wherein the duct, the oversheath, the first module, and the second module define an open space, wherein the open space contains a fluid which is able to cool at least one of the first module or the second module as the fluid flows through the open space; and receiving a signal from at least one of the first module or the second module as the device is buried in the soil.

15. The method of claim 14, wherein the first module and the second module extend along a plane that is longitudinal to the duct and that passes through the first module and the second module.

16. The method of claim 14, wherein the at least one of the first module or the second module is secured to the duct via a heat treatment to the oversheath before the burying such that the oversheath constricts upon being allowed to cool.

17. The method of claim 14, wherein the oversheath extends along the duct longitudinally such that the oversheath defines a plurality of troughs, wherein at least one of the first module or the second module is positioned between the troughs.

18. The method of claim 17, wherein the troughs include a first trough and a second trough, wherein the first trough is between the first module and the second module.

19. The method of claim 17, wherein at least one of the troughs avoids contact with the duct such that an open area is defined between the at least one of the troughs and the duct.

\* \* \* \* \*